United States Patent
Burkman et al.

(10) Patent No.: US 10,044,022 B2
(45) Date of Patent: Aug. 7, 2018

(54) FINGER PROOF FUSE RETENTION

(71) Applicant: FORD GLOBAL TECHNOLOGIES, LLC, Dearborn, MI (US)

(72) Inventors: Wesley Edward Burkman, Dearborn, MI (US); Eric Scott Smolen, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

(21) Appl. No.: 14/924,853

(22) Filed: Oct. 28, 2015

(65) Prior Publication Data
US 2017/0125785 A1 May 4, 2017

(51) Int. Cl.
*H01M 2/34* (2006.01)
*H01H 69/02* (2006.01)
*H01H 85/055* (2006.01)
*H01H 85/165* (2006.01)
*H01M 2/10* (2006.01)
*H01H 85/20* (2006.01)
*H01H 85/25* (2006.01)

(52) U.S. Cl.
CPC .......... *H01M 2/348* (2013.01); *H01H 69/02* (2013.01); *H01H 85/055* (2013.01); *H01H 85/165* (2013.01); *H01H 85/203* (2013.01); *H01H 85/25* (2013.01); *H01M 2/1072* (2013.01); *H01H 2085/208* (2013.01); *H01M 2200/103* (2013.01); *H01M 2220/20* (2013.01)

(58) Field of Classification Search
CPC .... H01H 69/02; H01H 85/055; H01H 85/165; H01H 85/203; H01H 85/25; H01H 2085/208; H01M 2/1072; H01M 2/348; H01M 2200/103; H01M 2220/20
See application file for complete search history.

(56) References Cited

U.S. PATENT DOCUMENTS

| | | | |
|---|---|---|---|
| 4,128,291 A | 12/1978 | Peterson, Jr. | |
| 4,547,036 A * | 10/1985 | Keglewitsch | H01H 85/24 439/680 |
| 4,971,582 A * | 11/1990 | Keglewitsch | H01H 85/202 439/831 |
| 5,751,208 A | 5/1998 | Martinez | |
| 6,837,755 B1 * | 1/2005 | Kitajima | H01H 85/202 439/830 |
| 7,244,148 B2 | 7/2007 | Maguire et al. | |
| 9,028,986 B2 | 5/2015 | Ijaz et al. | |
| 2010/0147726 A1 * | 6/2010 | Timmann | B65D 23/0871 206/459.5 |
| 2011/0045343 A1 | 2/2011 | Barkoczi et al. | |
| 2015/0111412 A1 * | 4/2015 | Krauss | H01H 85/202 439/366 |
| 2016/0344073 A1 * | 11/2016 | Hayashi | H01M 10/6566 |

FOREIGN PATENT DOCUMENTS

| | | |
|---|---|---|
| KR | 2015-0001826 Y | 5/2015 |
| WO | 2014/003353 A1 | 1/2014 |

* cited by examiner

Primary Examiner — Muhammad S Siddiquee
(74) Attorney, Agent, or Firm — Carlson, Gaskey & Olds

(57) ABSTRACT

A fuse assembly according to an exemplary aspect of the present disclosure includes, among other things, a housing, a fuse received within a receptacle of the housing and a retention device configured to retain the fuse within the receptacle and cover a conductive surface of the fuse.

17 Claims, 5 Drawing Sheets

FINGER PROOF FUSE RETENTION

TECHNICAL FIELD

This disclosure relates to a fuse assembly for use within electrical systems of an electrified vehicle.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

Electrified vehicles include multiple electrical systems for distributing electric power throughout the vehicle. Fuses are used in many such electrical systems, including within a high voltage battery pack that is employed to selectively power the electrified vehicle. Fuses are designed to open when an abnormality occurs in the electrical system in order to interrupt the circuit. Fuses therefore act as sacrificial devices for protecting the electrical systems from damage during circuit overload conditions.

SUMMARY

A fuse assembly according to an exemplary aspect of the present disclosure includes, among other things, a housing, a fuse received within a receptacle of the housing and a retention device configured to retain the fuse within the receptacle and cover a conductive surface of the fuse.

In a further non-limiting embodiment of the foregoing fuse assembly, the retention device includes a first retention finger and a second retention finger.

In a further non-limiting embodiment of either of the foregoing fuse assemblies, the first retention finger and the second retention finger are flexible between a first position in which the first retention finger is proximate to the second retention finger and a second position in which the first retention finger and the second retention finger are spread apart from one another.

In a further non-limiting embodiment of any of the foregoing fuse assemblies, the conductive surface is part of an end cap or a terminal of the fuse.

In a further non-limiting embodiment of any of the foregoing fuse assemblies, a pull tab is connected to the fuse.

A battery pack according to another exemplary aspect of the present disclosure includes, among other things, a housing, a fuse received within the housing and a first retention finger and a second retention finger each flexible between a first position and a second position relative to the fuse, the first retention feature and the second retention feature cooperating to cover a conductive surface of the fuse in the first position.

In a further non-limiting embodiment of the foregoing battery pack, the housing is positioned adjacent to at least one grouping of battery cells.

In a further non-limiting embodiment of either of the foregoing battery packs, the first retention finger is proximate to the second retention finger in the first position and the first retention finger and the second retention finger are spread apart from one another in the second position.

In a further non-limiting embodiment of any of the foregoing battery packs, each of the first retention finger and the second retention finger include a lead-in ramp configured to guide the fuse between the first retention finger and the second retention feature.

In a further non-limiting embodiment of any of the foregoing battery packs, the battery pack includes a beveled surface on an underside of a head of each of the first retention feature and the second retention feature.

In a further non-limiting embodiment of any of the foregoing battery packs, the first retention finger and the second retention finger extend upwardly from the housing between walls of the housing.

In a further non-limiting embodiment of any of the foregoing battery packs, the battery pack includes a third retention finger and a fourth retention finger cooperating to cover a second conductive surface of the fuse.

In a further non-limiting embodiment of any of the foregoing battery packs, a terminal of the fuse engages a mating terminal located within a receptacle of the housing.

In a further non-limiting embodiment of any of the foregoing battery packs, a pull tab is connected to the fuse.

In a further non-limiting embodiment of any of the foregoing battery packs, the pull tab includes a body attached to the fuse and an extension that extends from the body.

A method according to another exemplary aspect of the present disclosure includes, among other things, positioning a fuse within a receptacle of a housing of an electrical system of an electrified vehicle such that a conductive surface of the fuse is substantially covered by a retention device of the housing.

In a further non-limiting embodiment of the foregoing method, the electrical system is a battery pack of the electrified vehicle.

In a further non-limiting embodiment of either of the foregoing methods, positioning the fuse includes moving the fuse along a lead-in ramp of the retention device.

In a further non-limiting embodiment of any of the foregoing methods, the method includes spreading apart a first retention finger and a second retention finger of the retention device as the fuse is moved further toward a mating terminal housed in the receptacle.

In a further non-limiting embodiment of any of the foregoing battery packs, the method includes moving the first retention finger and the second retention finger back toward one another after the fuse has engaged the mating terminal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a fuse assembly for use within an electrical system. In one non-limiting embodiment, the fuse assembly is utilized within a high voltage battery pack of an electrified vehicle. The fuse assembly includes a housing and a fuse received within a receptacle of the housing. One or more retention devices retain the fuse within the receptacle and simultaneously cover a conductive surface of the fuse. In some embodiments, the retention devices include pairs of retention fingers that spread apart when the fuse is installed and spring back toward one another to cover the conductive services after the fuse is received within a mating terminal of the fuse assembly. These and other features are discussed in greater detail in the following paragraphs of this detailed description.

Figure 1:
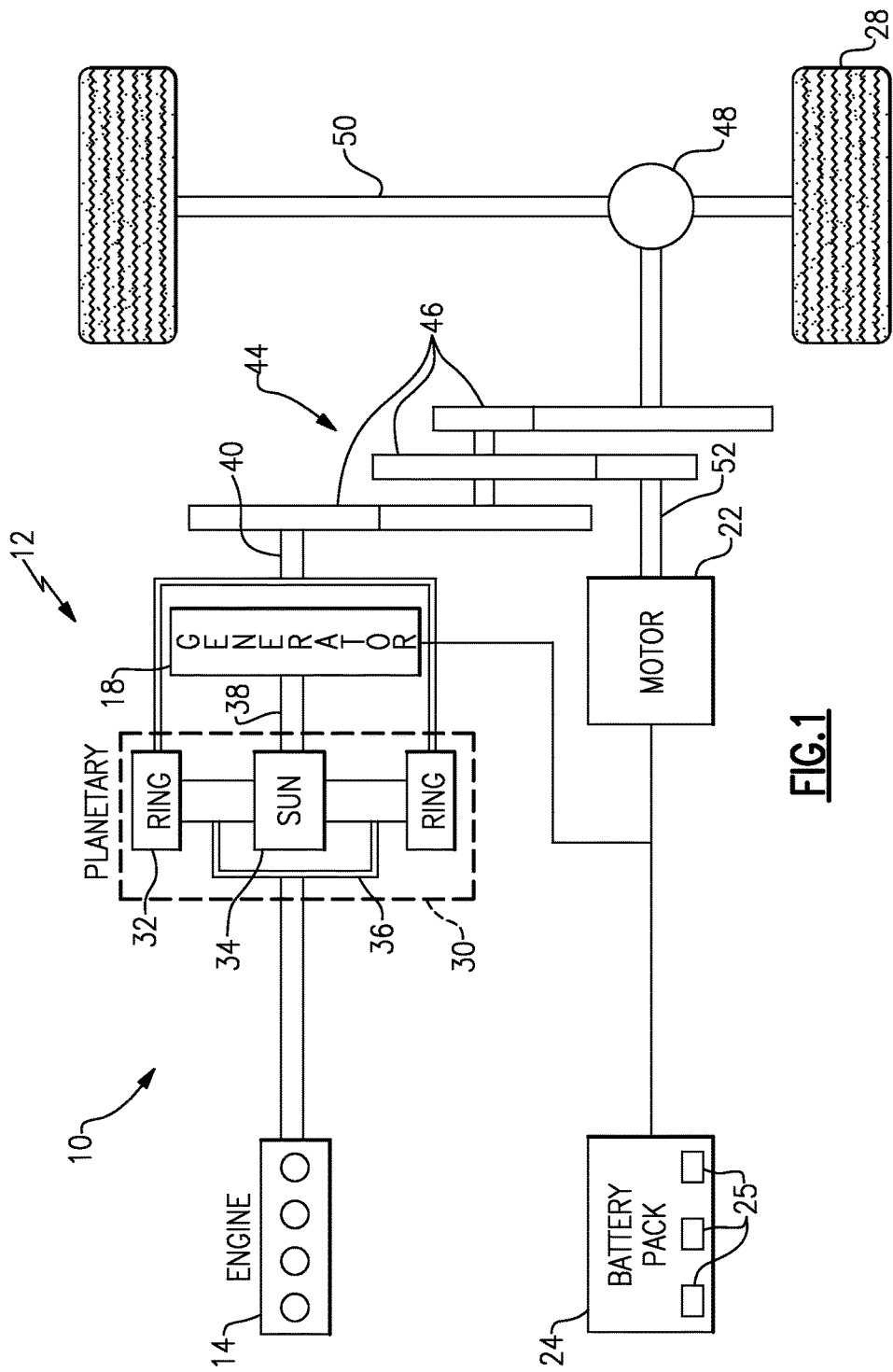
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
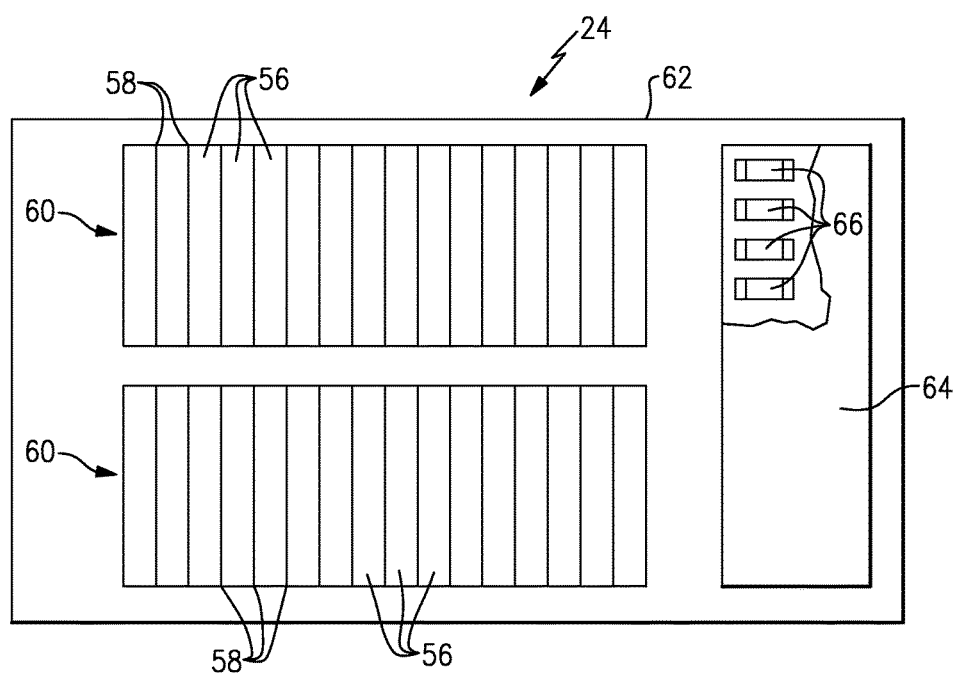
FIG. 2 illustrates a battery pack of an electrified vehicle.

FIG. 2 schematically illustrates portions of a battery pack 24 of an electrified vehicle. For example, the battery pack 24 could be part of the electrified vehicle 12 of FIG. 1 or any other vehicle. The battery pack 24 is one example of the many electrical systems that may be employed to distribute power throughout an electrified vehicle.

The battery pack 24 includes a plurality of battery cells 56 for supplying electrical power to various electrical loads of the electrified vehicle 12. The battery cells 56 may be stacked side-by-side along a longitudinal axis to construct one or more groupings of battery cells 56, sometimes referred to as "cell stacks." Spacers 58, which can alternatively be referred to as separators or dividers, may be positioned between adjacent battery cells 56 of each grouping of battery cells 56. The spacers 58 may include thermally resistant and electrically isolating plastics and/or foams. The battery cells 56 and the spacers 58 are together referred to as a battery array 60. Two battery arrays 60 are shown in FIG. 2; however, the battery pack 24 could include only a single battery array or greater than two battery arrays.

In one non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

An enclosure 62 generally surrounds the battery arrays 60 of the battery pack 24. The enclosure 62 may include multiple walls that support, surround or otherwise house the components of the battery pack 24.

A housing 64 may be disposed inside the battery pack 24. The housing 64 is positioned adjacent to the battery arrays 60 and could be mounted to one or more of the walls of the enclosure 62. The specific arrangement of the housing 64 and the battery arrays 60 shown in FIG. 2 is but one non-limiting example of how the various components of the battery pack 24 could be arranged and is not intended to limit this disclosure. In one non-limiting embodiment, the housing 64 is a fuse box or junction box that acts as the electrical center of the battery pack 24. In another non-limiting embodiment, the housing 64 is a stand-alone fuse holder.

One or more fuses 66 may be received by the housing 64. A portion of the housing 64 is shown removed in FIG. 2 to better illustrate the fuses 66. Each fuse 66 is designed to open when an abnormality occurs within the electrical system, here the battery pack 24. For example, the fuses 66 may act as sacrificial devices for interrupting a circuit to prevent damage to the electrical system during circuit overload conditions.

Figure 3:
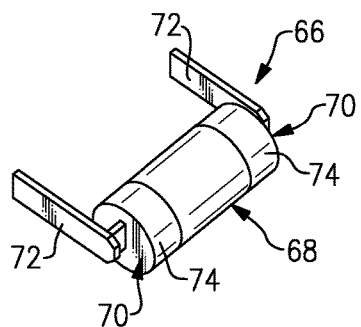
FIG. 3 illustrates a fuse.

An exemplary fuse 66 that could be employed for use within the battery pack 24 of FIG. 2 or any other electrical system is illustrated in FIG. 3. In one non-limiting embodiment, the fuse 66 is a cylindrical, plug-in type fuse. However, other types of fuses could also benefit from the teachings of this disclosure. In another non-limiting embodiment, the fuse 66 is part of a high voltage load circuit (e.g., voltage rating of 250-600V).

The fuse 66 includes a body 68, end caps 70 disposed on opposing sides of the body 68, and terminals 72 that extend from the end caps 70. The body 68 of the fuse 66 may be made of a non-conductive material, such as plastic or glass, for example. The body 68 houses a fuse element (not shown) configured to open the circuit (e.g., blow) during current overload conditions. The terminals 72 may or may not be electrically connected to the end caps 70.

The end caps 70 are made of conductive materials, such as copper, aluminum, etc., and therefore include conductive surfaces 74. In one non-limiting embodiment, current flows across the terminals 72 and over the conductive surfaces 74 of the end caps 70 as it passes through the fuse 66. A relatively high voltage can be applied to the conductive surfaces 74 during certain conditions. It may be therefore be desirable to prevent human exposure to the conductive surfaces 74, such as during a servicing event of the battery pack 24. The remaining portion of this disclosure describe various retention devices that are configured to both retain the fuse 66 within the housing 64 and cover the conductive surfaces 74 or any other surfaces of the fuse 66 that may be subject to high voltages to prevent high voltage contact.

Figure 4A:
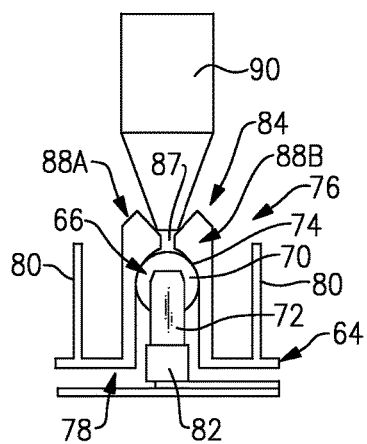
FIGS. 4A and 4B illustrate a fuse assembly according to a first embodiment of this disclosure.
Figure 4B:
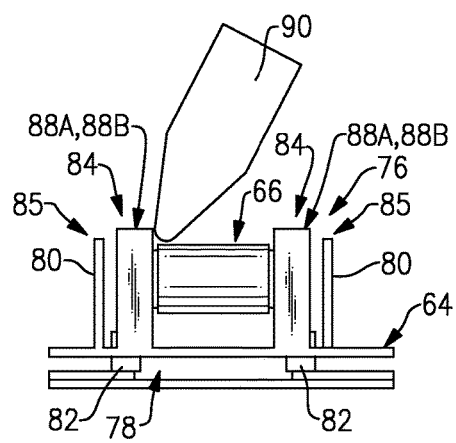

FIGS. 4A and 4B illustrate a fuse assembly 76 for use within the battery pack 24 or any other electrical system. The fuse assembly 76 includes a fuse 66 and a housing 64. The housing 64 includes a receptacle 78 for receiving the fuse 66. The receptacle 78 may be circumscribed by vertical walls 80 that protrude upwardly from the housing 64. The terminals 72 of the fuse 66 are received within mating terminals 82 that are mounted within the receptacle 78.

The fuse assembly 76 may additionally include one or more retention devices 84 for retaining the fuse 66 within the receptacle 78. The retention devices 84 could be an integral part of the housing 64 or could alternatively be separate devices that are mechanically mounted to the housing 64. The retention devices 84 protrude upwardly from the housing 64 and may be disposed at a location between the vertical walls 80.

In one non-limiting embodiment, the retention devices 84 include pairs of retention fingers 88A, 88B located near opposing ends 85 of the receptacle 78. However, the retention fingers 88A, 88B could be disposed along any portion of the receptacle 78. The housing 64 may include four retention fingers, or two pairs of the retention fingers 88A, 88B. The retention fingers 88A, 88B are positioned on opposite sides of the fuse 66 once it is connected to the mating terminals 82 (see FIG. 4A). A relatively small gap 87 may optionally extend between the retention fingers 88A, 88B. The gap 87 is small enough to make it very difficult for a human finger 90 or other similarly sized object to make contact with the fuse 66 between the retention fingers 88A, 88B.

The retention devices 84 of the fuse assembly 76 serve a dual purpose. First, the retention devices 84 retain the fuse 66 within the receptacle 78 and prevent the fuse 66 from backing out of the mating terminals 82. Second, the retention devices 84 substantially cover the conductive surfaces 74 of the end caps 70 and terminals 72 of the fuse 66 or any other surface of the fuse 66 that may have high voltage on it. For example, in one non-limiting embodiment, the retention fingers 88A, 88B are configured to cover the conductive surfaces 74 once the fuse 66 is received within the receptacle 78 and the terminals 72 are connected to the mating terminal 82. The retention fingers 88A, 88B therefore prevent a human finger 90 from coming into contact with the conductive surfaces 74 of the fuse 66.

Figure 5A:
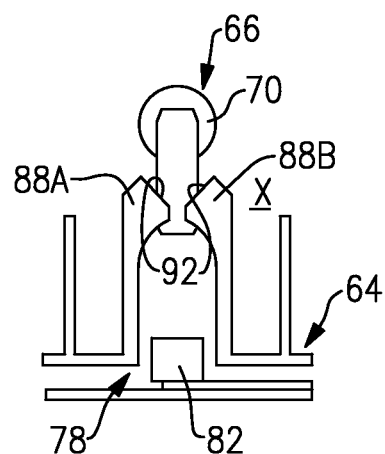
FIGS. 5A, 5B, 5C and 5D illustrate an exemplary fuse insertion method.
Figure 5B:
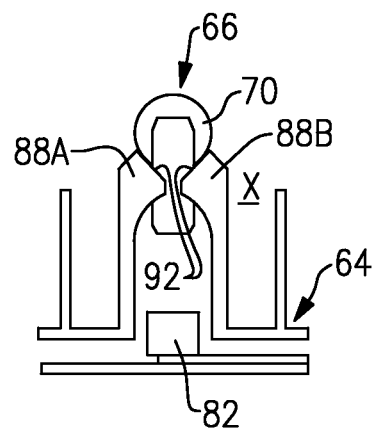

FIGS. 5A-5D schematically illustrate an exemplary method for inserting the fuse 66 into the receptacle 78 of the housing 64. Referring first to FIG. 5A, the fuse 66 is positioned above the receptacle 78 of the housing 64. The fuse 66 is then moved toward the mating terminals 82 until the end caps 70 contact the retention fingers 88A, 88B, as shown in FIG. 5B. FIGS. 5A and 5B both shown the retention fingers 88A, 88B positioned proximate to one another in a first position X.

Figure 5C:
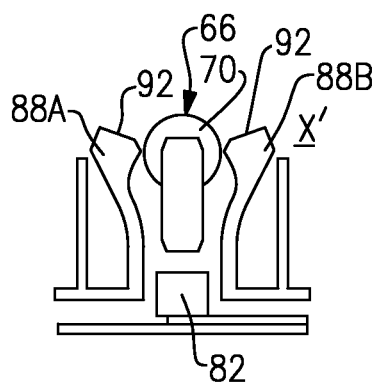
Figure 5D:
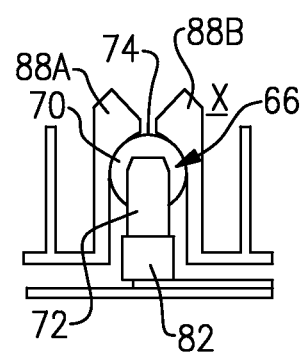

The retention fingers 88A, 88B are flexible and may include lead-in ramps 92 that help guide the fuse 66 into the receptacle 78. For example, as shown in FIG. 5C, the retention fingers 88A, 88B spread apart from one another as the end caps 70 (or fuse body 68) are guided along the lead-in ramps 92. As the fuse 66 moves further toward the mating terminals 82, the retention fingers 88A, 88B spread further apart to a second position X' to permit the end caps 70 and/or the fuse body 68 of the fuse 66 to pass between the retention fingers 88A, 88B. Finally, as shown in FIG. 5D, the spring fingers 88A, 88B may move back toward one another (i.e., move back to the first position X) to cover the conductive surfaces 74 of the fuse 66 once the terminals 72 of the fuse 66 have engaged the mating terminals 82.

Figure 6A:
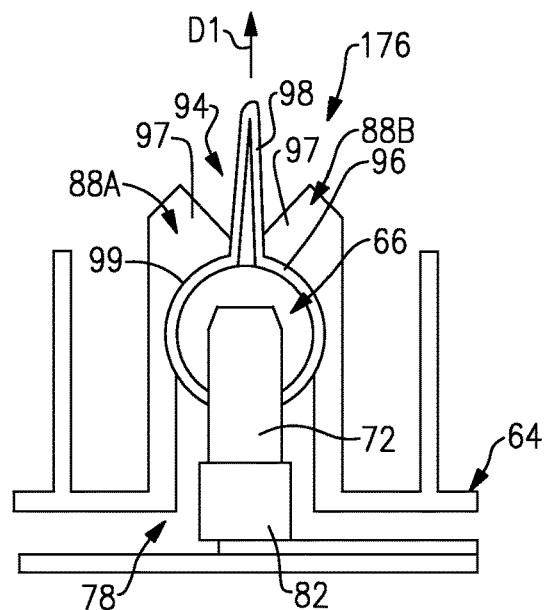
FIGS. 6A and 6B illustrate a fuse assembly according to a second embodiment of this disclosure.
Figure 6B:
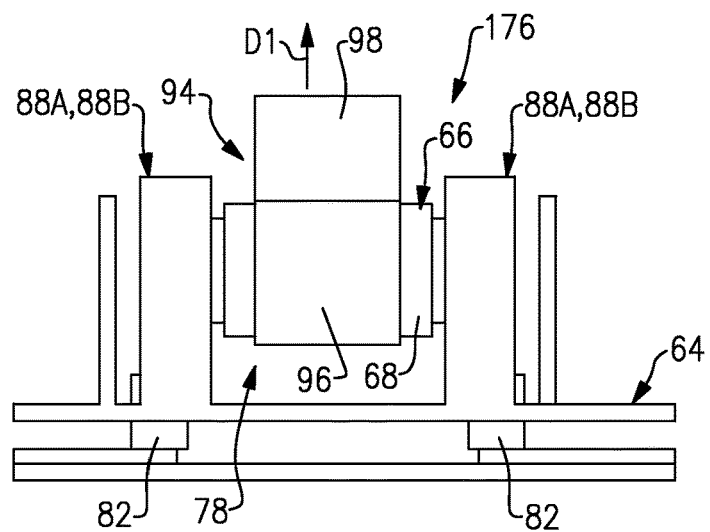

FIGS. 6A and 6B illustrate another exemplary fuse assembly 176. The fuse assembly 176 is similar to the fuse assembly 76 of FIGS. 4A and 4B but additionally includes a pull tab 94 for selectively removing the fuse 66 from the receptacle 78 of the housing 64. In one non-limiting embodiment, the pull tab 94 is a piece of tape with sufficient strength for disengaging the terminals 72 from the mating terminals 82 and removing the fuse 66 from between the retention fingers 88A, 88B. The pull tab 94 may include a body 96 that is wrapped around the body 68 of the fuse 66 (see FIG. 6B) and an extension 98 that extends from the body 96 and which may be tugged in a direction D1 to remove the fuse 66.

In another non-limiting embodiment, the retention fingers 88A, 88B include beveled surfaces 99 (see FIG. 6A) that act as ramps to spread the retention fingers 88A, 88B apart as the pull tab 94 is used to remove the fuse 66 from the receptacle 78. The beveled surfaces 99 may be located on an underside of a head 97 of each retention finger 88A, 88B. The beveled surfaces 99 may generally match the curvature of the end caps 70 or fuse body 68 of the fuse 66, in one non-limiting embodiment.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    a housing;
    a fuse received within said housing; and
    a first retention finger and a second retention finger each flexible between a first position and a second position relative to said fuse, said first retention feature and said second retention feature cooperating to envelop at least a top half of a conductive surface of said fuse in said first position.

2. The battery pack as recited in claim 1, wherein said housing is positioned adjacent to at least one grouping of battery cells.

3. The battery pack as recited in claim 1, wherein said first retention finger is proximate to said second retention finger in said first position and said first retention finger and said second retention finger are spread apart from one another in said second position.

4. The battery pack as recited in claim 1, wherein each of said first retention finger and said second retention finger include a lead-in ramp configured to guide said fuse between said first retention finger and said second retention feature.

5. The battery pack as recited in claim 1, comprising a beveled surface on an underside of a head of each of said first retention feature and said second retention feature.

6. The battery pack as recited in claim 1, wherein said first retention finger and said second retention finger extend upwardly from said housing between walls of said housing.

7. The battery pack as recited in claim 1, comprising a third retention finger and a fourth retention finger cooperating to cover a second conductive surface of said fuse.

8. The battery pack as recited in claim 1, wherein a terminal of said fuse engages a mating terminal located within a receptacle of said housing.

9. The battery pack as recited in claim 1, comprising a pull tab connected to said fuse.

10. The battery pack as recited in claim 9, wherein said pull tab includes a body attached to said fuse and an extension that extends from said body.

11. The battery pack as recited in claim 10, wherein said body of said pull tab is wrapped around a body of said fuse.

12. The battery pack as recited in claim 9, wherein said pull tab is a piece of tape.

13. The battery pack as recited in claim 1, wherein said conductive surface is part of a terminal of said fuse.

14. The battery pack as recited in claim 1, wherein said conductive surface is part of an end cap of said fuse, and comprising a second conductive surface that is part of a terminal of said fuse, and said second conductive surface is also covered by said first retention feature and said second retention feature.

15. The battery pack as recited in claim 14, wherein said terminal extends from said end cap.

16. A battery pack, comprising:
    a housing;
    a fuse received within said housing;
    a first retention finger and a second retention finger cooperating to both retain said fuse to said housing and envelop at least a top half of a conductive surface of said fuse; and
    a pull tab wrapped around said fuse for disengaging said fuse from said housing.

17. The battery pack as recited in claim 16, wherein an underside of a head of each of said first retention finger and said second retention finger includes a beveled surface.

* * * * *

UNITED STATES PATENT AND TRADEMARK OFFICE
CERTIFICATE OF CORRECTION

PATENT NO. : 10,044,022 B2  Page 1 of 1
APPLICATION NO. : 14/924853
DATED : August 7, 2018
INVENTOR(S) : Burkman et al.

It is certified that error appears in the above-identified patent and that said Letters Patent is hereby corrected as shown below:

In the Claims

In Claim 1, Column 7, Line 43; replace "said first retention feature" with --said first retention finger--

In Claim 1, Column 7, Line 44; replace "second retention feature" with --second retention finger--

In Claim 4, Column 8, Line 7; replace "said second retention feature." with --said second retention finger.--

In Claim 5, Column 8, Line 10; replace "first retention feature and said second retention feature." with --first retention finger and said second retention finger.--

In Claim 14, Column 8, Line 35; replace "said first retention feature" with --said first retention finger--

In Claim 14, Column 8, Line 36; replace "retention feature." with --retention finger.--

Signed and Sealed this
Eleventh Day of January, 2022

Drew Hirshfeld
*Performing the Functions and Duties of the
Under Secretary of Commerce for Intellectual Property and
Director of the United States Patent and Trademark Office*